Feb. 20, 1951     C. B. GRAY     2,542,810
CUTTING MACHINE DRIVE
Filed Nov. 6, 1947     4 Sheets-Sheet 2

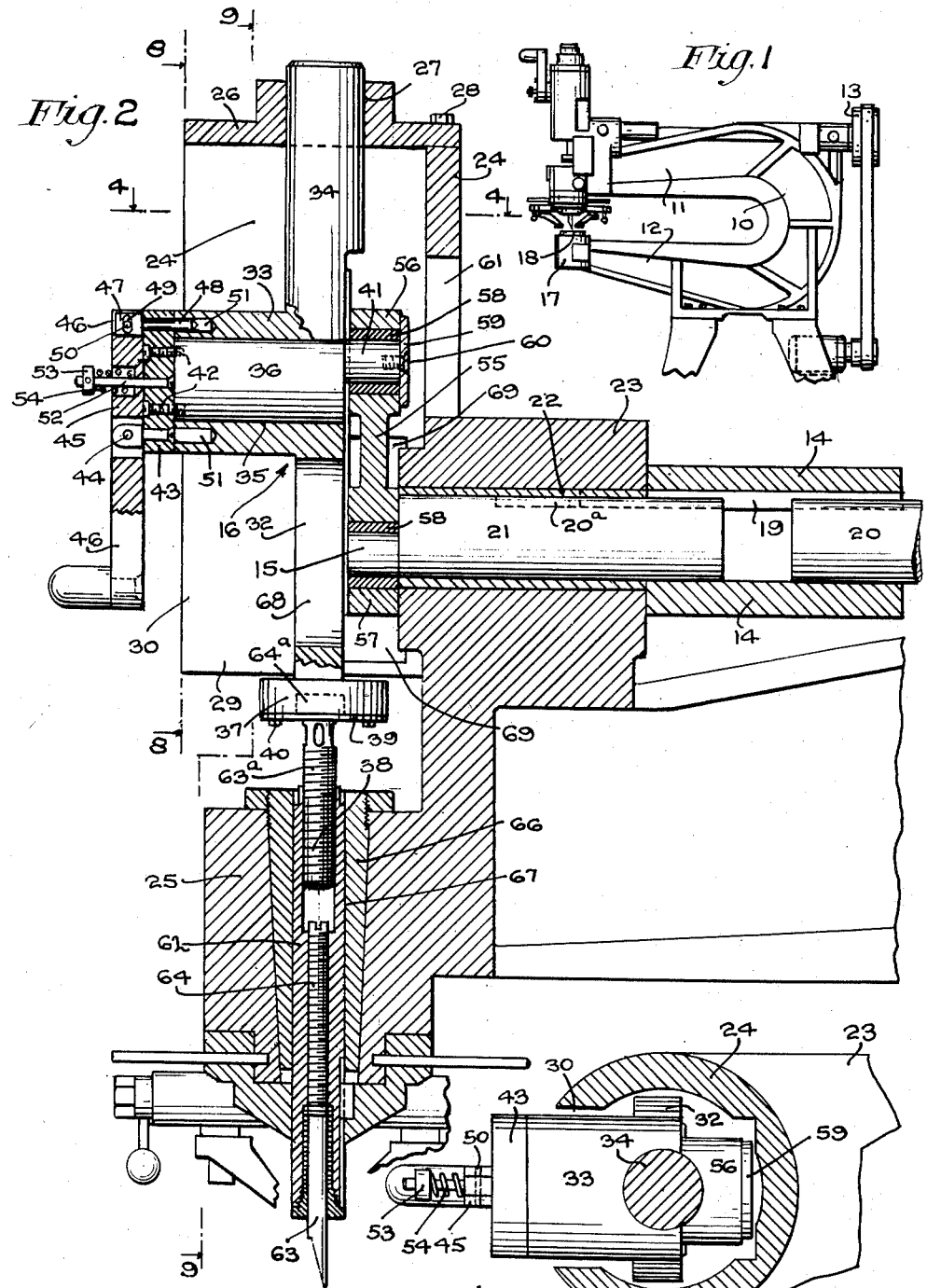

Inventor
CHARLES B. GRAY
By Leo Edelson
Attorney.

Feb. 20, 1951 — C. B. GRAY — 2,542,810
CUTTING MACHINE DRIVE
Filed Nov. 6, 1947 — 4 Sheets-Sheet 3
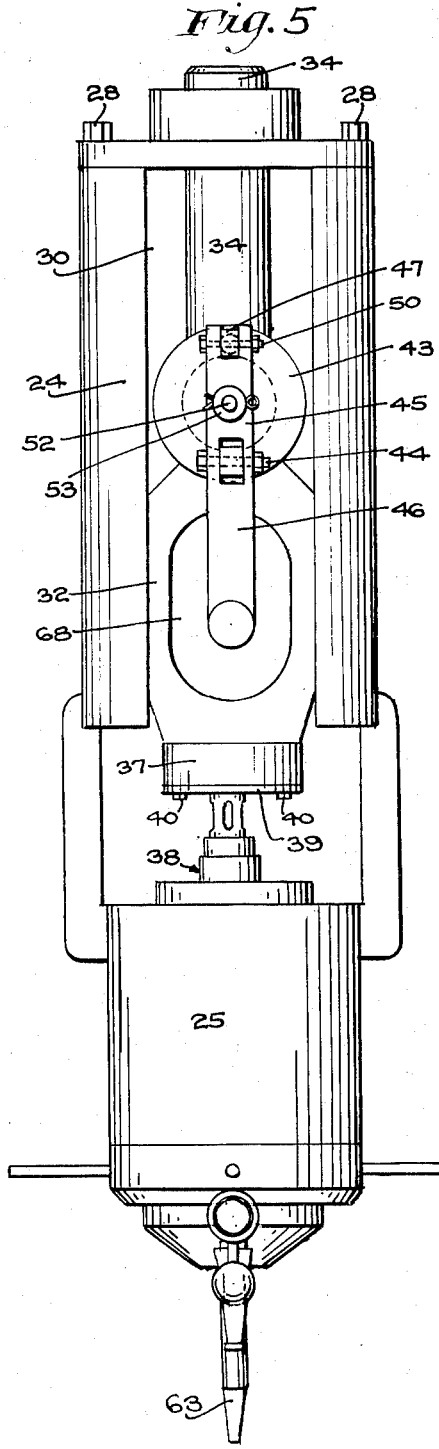
Inventor
CHARLES B. GRAY
By Leo Edelson
Attorney.

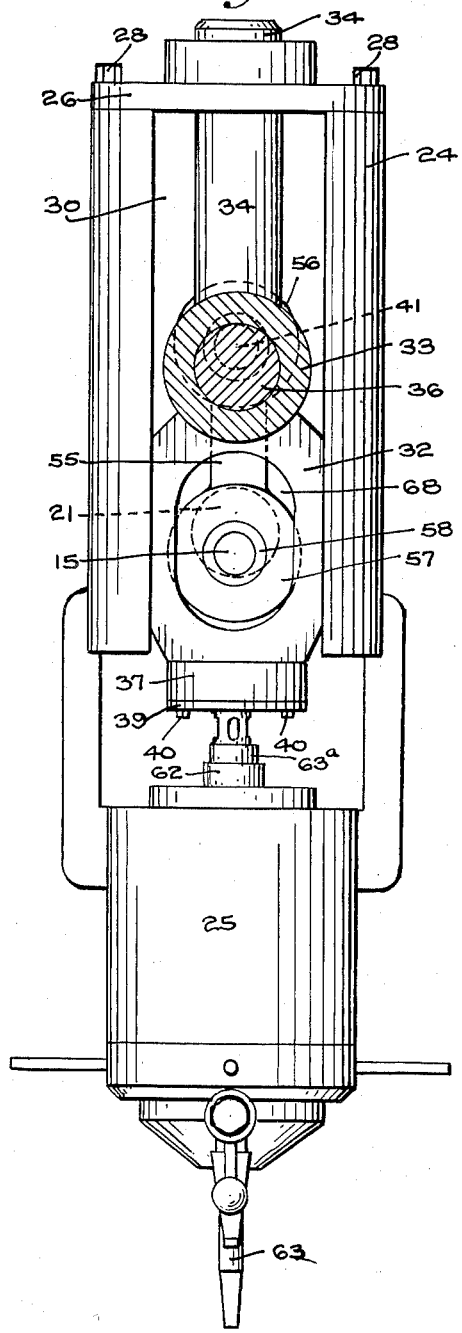
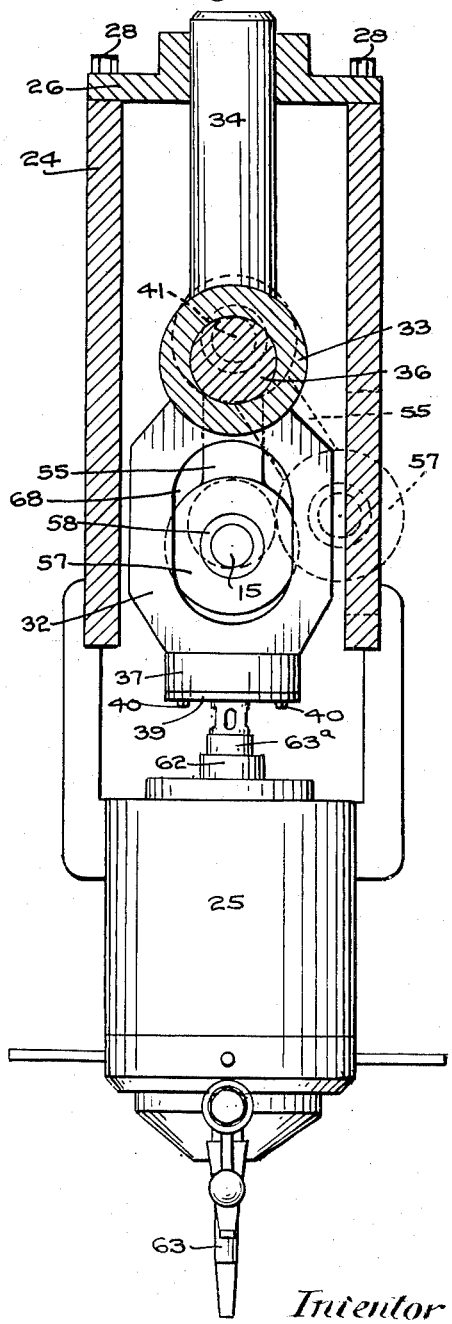

Patented Feb. 20, 1951

2,542,810

UNITED STATES PATENT OFFICE 2,542,810

CUTTING MACHINE DRIVE

Charles B. Gray, Springfield, Pa.

Application November 6, 1947, Serial No. 784,483

7 Claims. (Cl. 74—44)

This invention relates to cutting machines of the reciprocatory punch type known in the sheet metal cutting art as nibbling machines.

Among the principal objects of the present invention is to provide an improved construction of cross-head for effecting reciprocation of the cutting tool relatively to the sheet metal being cut and which permits the reciprocating cutting tool assembly to be raised above the level of the work without any interruption in its reciprocating movement whereby the reciprocating tool is freed from the work for such handling or adjustment of the latter as may be necessary during the cutting operation.

A further and important object of the present invention is to provide a cross-head construction which is reciprocable by means of an eccentric link or strap operatively interconnecting the cross-head and the motor driven drive shaft of the cutting machine, the machine being particularly characterized by the fact that the eccentric strap arrangement is such as permits bodily removal of the drive shaft eccentric without necessitating removal or mechanical disturbance of the cross-head and its associated cutting tool assembly.

Still another object of the present invention is to provide a simple and efficient construction of reciprocable cross-head having operatively associated therewith a swivel mounted cutting tool assembly, the cross-head being restricted to and guided for rectilinear movement along a fixed vertical line by vertically alined bearings of which the lower one is that normally employed in nibbling tools for guiding the reciprocating cutting tool assembly.

A further object of the invention is to provide an exceedingly simple and effective mechanism for raising and lowering the cutting tool, even during operation of the machine, so as to render the reciprocating cutting tool operative or inoperative to cut the sheet metal fed into the machine, the arrangement being such that the cross-head and its associated tool assembly is raised or lowered as a unit without changing the effective stroke of the cutting tool per se. Such stroke, however, may be changed as required by suitable replacement of the drive shaft eccentric and to this end means is provided for ready removal and replacement of the drive shaft eccentric without necessitating removal of the cross-head proper.

Other objects and advantages of the present invention will appear more fully hereinafter, it being understood that the invention consists substantially in the combination, construction, location and relative arrangement of parts, all as will be described in detail hereinafter, as shown in the accompanying drawings and as finally pointed out in the appended claims.

In the accompanying drawings, which are illustrative of a preferred construction of machine embodying the principles of the present invention:

Figure 1 is a side elevational view of the cutting machine;

Figure 2 is a vertical sectional view of the upper portion of the machine as constructed in accordance with the present invention, showing the reciprocating cutting tool in lowered position for operative work upon the sheet material to be cut;

Figure 4 is a horizontal sectional view as taken along the line 4—4 of Figure 2;

Figure 5 is a front elevational view of that portion of the machine which is shown in section in Figures 2 and 3;

Figure 6 is a perspective view of the cross-head member of the machine;

Figure 7 is a perspective view of the eccentric strap or link member;

Figure 8 is a view, partially in vertical section, as taken along the line 8—8 of Figure 2; and Figure 9 is a view, partially in vertical section, as taken along the line 9—9 of Figure 2.

Figure 3:
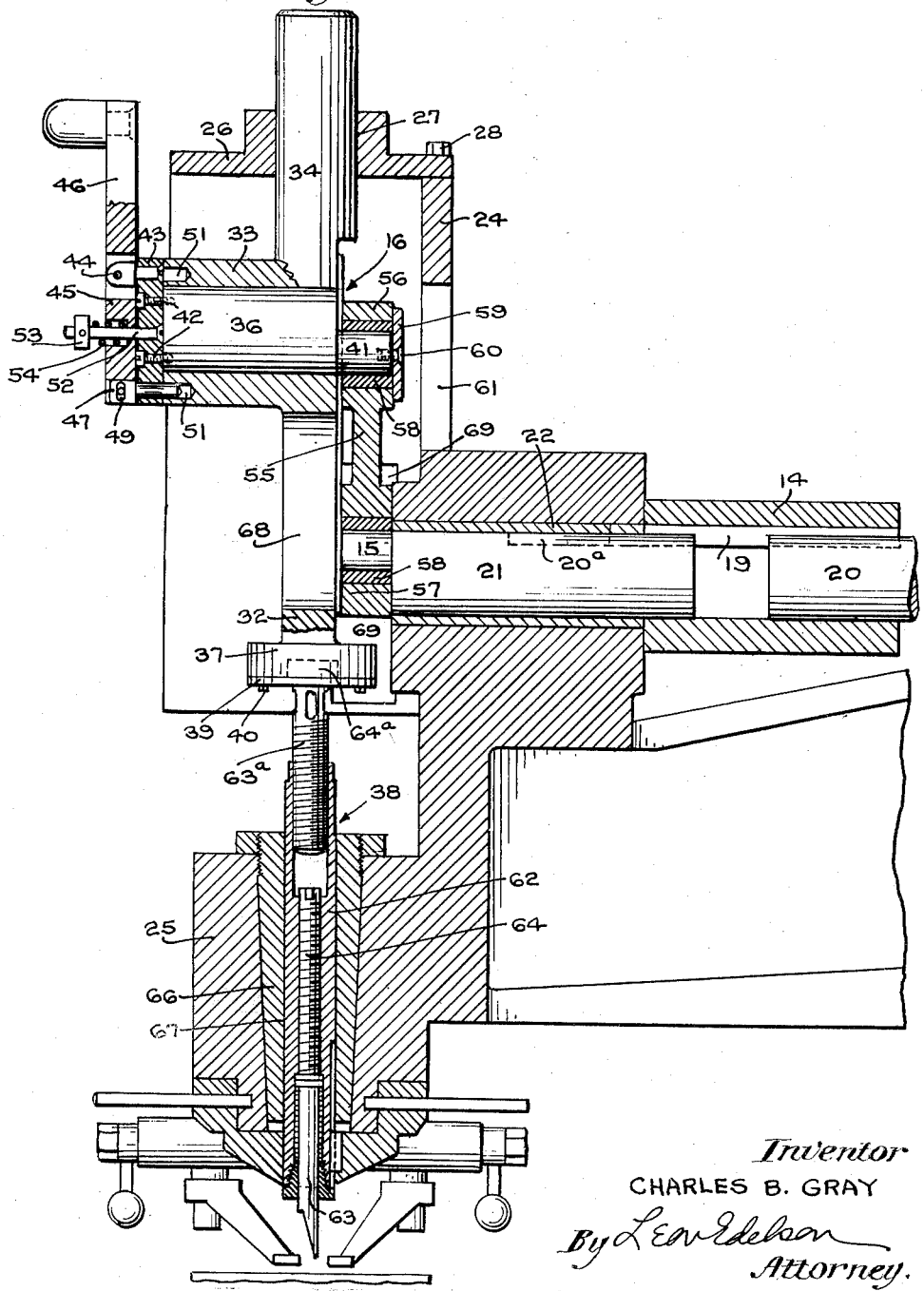
Figure 3 is a vertical sectional view corresponding to Figure 1 but showing the cutting tool raised into inoperative work position.

Referring now more particularly to the drawings, it will be observed that the nibbing machine of the present invention includes a frame 10 having an upper jaw 11 and a lower jaw 12. The upper jaw carries a driving member 13 connected by a disconnectible coupling member 14 to an eccentric 15 for converting rotary motion of the driving member 13 into reciprocatory motion of a cross-head 16 to which a suitable tool may be connected. The lower jaw 12 is provided with a block 17 for receiving and holding in firmly adjusted position a suitably fixed die 18.

As most clearly appears in Figures 2 and 3, the coupling member 14 is in the form of a sleeve suitably fixed to the shaft 20 of the drive member and having an axially extending key or spline 19 formed internally thereof, said key being received in a key way 20a formed in the shaft 21 of the eccentric 15. The shaft 21, of which the eccentric 15 forms an integral part, is suitably journalled in the upper jaw of the machine, a bronze or other suitable bearing sleeve 22 being interposed between said shaft 21 and its bearing block 23. It will be noted that the eccentric 15 normally projects freely beyond the forward end of the bearing block 23 and that the shaft 21 is spaced axially from the drive shaft 20 a distance somewhat greater than the axial length of the eccentric 15, thereby permitting the eccentric shaft 21 to be shifted rearwardly, as occasion may require, a distance sufficient to present the forward end of the eccentric in planar coincidence with the corresponding end of the bearing block 23.

The forward end of the upper jaw 11 of the machine is provided with a hollow cylindrical body portion 24 and with a vertically bored body portion 25 spaced below the portion 24, both of said body portions 24 and 25 being formed as integral extensions of the upper jaw of the machine and disposed with their vertical axes in coincidence. The upper cylindrical body portion 24 supports on its upper end a bearing member 26 having a vertical bore 27 extending therethrough, said bearing member 26 being removably secured in position by suitable bolts 28 or the like. The bottom end of the body portion 24 is open, as at 29, while the front wall thereof is also provided with an opening 30 extending the full length of the body portion 24.

Disposed interiorly of the cylindrical body portion 24 for vertical reciprocation therein is a cross-head 16 of the form most clearly shown in Figure 6. It will be observed that said cross-head 16 is in the form of a one-piece member having a slotted part 32, a laterally extending part 33 and a vertically extending stem 34. The laterally extending part 33 is longitudinally bored, as at 35, to provide a horizontal bearing for an eccentric shaft 36 (see Figures 2 and 3), while the vertically extending stem 34 constitutes a solid guide rod which extends through the vertical bore 27 of the upper bearing member 26. The lower end of the slotted part 32 of the cross-head is provided with a terminal member 37 which is centrally recessed to accommodate the circular upper end or swivel head of a cutting tool assembly 38 of the character generally shown and described in my prior United States Letters Patent No. 2,227,081, granted December 31, 1940. The swivel head of the cutting tool assembly is operatively disposed within the terminal member 37 of the cross-head by means of a removable plate 39 secured in place by the bolts 40.

As most clearly appears in Figures 2, 3 and 4, the laterally extending part 33 extends forwardly of the cross-head and projects through the front wall opening 30 of the upper cylindrical portion 24 of the machine frame, the transverse dimension of the said part 33 relatively to that of said opening 30 being such as to permit free movement of the cross-head vertically within the cylindrical portion 24.

Rotatably journalled within the forwardly extending part 33 of the cross-head is the eccentric shaft 36 the rear end of which is formed with an axially extending eccentric 41 adapted for disposition vertically above the eccentric 15 of the operating shaft 21. Secured to the front end of the upper eccentric shaft 36, as by the screws 42, is a plate 43 which limits axial movement of the shaft 36 rearwardly through its bearing 33.

Pivotally mounted upon the plate 43, as at 44, and extending transversely of the plate is an operating handle 45, this handle being provided with an extension 46 projecting well beyond that edge of the plate 43 which is immediately adjacent the pivot pin 44 of the handle. The opposite end of the handle 45 is kerfed, as at 46, to receive the enlarged flattened head 47 of an anchoring pin 48, said head 47 being provided with an elongated opening 49 through which projects a pivot pin 50 fixed in the kerfed end of the handle. A pair of diametrically opposed sockets 51—51 are formed in the end of the bearing part 33 of the cross-head, the anchoring pin 48 being adapted for projection into one or the other of said sockets 51—51 as the handle 45 is shifted from its position shown in Figure 2 into that shown in Figure 3, or vice versa. A stem 52 projecting centrally through the plate 43 and the handle 45, is provided at its outer end with an abutment 53 against which a coiled compression spring 54 reacts to maintain the handle flatwise against the plate 43 with the anchoring pin 48 thereof seated in one or the other of the sockets 51—51.

It will be apparent that the plate 43 and the spring-pressed handle 45 pivotally mounted upon the plate are rotatable with the eccentric shaft 36 as a unit in consequence of which the handle may be employed to rotate the shaft 36 into the position shown in Figure 2 wherein the eccentric 41 thereof is in raised position relatively to the longitudinal axis of the shaft 36 or into the position shown in Figure 3 wherein the eccentric 41 is in lowered position relatively to said axis. The anchoring pin 48 selectively engageable with either of the sockets 51—51 of the shaft bearing 33 serves to lock the shaft 36 in one or the other of its two permissible positions, said anchoring being readily retracted from either socket by pressing the handle extension 46 inwardly against the bias of the spring 54 to shift the kerfed end of the handle away from the plate 43 and so draw the anchoring pin 48 out of its engaged socket. Thereupon, while still pressing the handle extension 46 inwardly, it may be rotated about the axis of the eccentric shaft 36 to rotate the shaft 36 through an arc of 180 degrees and present the anchoring pin 48 in registry with the other socket to thereby lock the shaft in its adjusted position.

It will be noted that the eccentric 41 of the shaft 36 rotatably carried by the cross-head 16 is disposed in vertically spaced relation with respect to the eccentric 15 of the operating shaft 21 of the machine, both eccentrics being thus movable in a common vertical plane extending transversely of the machine. Interconnecting the vertically spaced eccentrics 15 and 41 is an eccentric strap or link 55 of the form best shown in Figure 7, said link being provided at opposite ends thereof with suitably bored bosses 56 and 57 respectively fitted with bearing sleeve 58. The eccentric 41 snugly fits within the bearing sleeve of the boss 56, while the eccentric 15 correspondingly fits within the bearing sleeve of the boss 57. In order to secure the link 55 operatively between the eccentrics 41 and 15, the eccentric 41 is fitted at its rear end with a plate 59 of sufficient diameter to overlie the rear end of the boss 56. This plate 59, which is detachably secured to the eccentric 41 by a screw 60, additionally serves to prevent forward withdrawal with the shaft 36 from its bearing 33 forming an integral part of the cross-head 16. For purposes of removal of the securing plate 59, as when it becomes desirable or necessary to remove the eccentric shaft 36 from its bearing 33, an access opening 61 is provided in the rear wall portion of the cross-head enclosure 24, said opening 61 being, of course, in registry with the plate 59.

The cutting tool assembly 38, which is swivelly secured to and depends from the bottom end of the cross-head 16, is of the form generally shown and described in my prior United States Letters Patent No. 2,227,081 aforesaid. It will be understood, however, that the present invention is not restricted to the use of any particular cutting tool assembly so long as such assembly is suitably guided for rectilinear vertical reciprocation along an axis coincident with the vertical axis of the upper guide stem 34 of the reciprocating cross-head 16. In the particular construction shown, the cutting tool assembly 38 comprises a ram 62 into the upper end of which is threaded a stem 63ª having a swivel head 64ª which is received within the recess provided therefor in the terminal member 37 of the cross-head 16. Suitably fitted in the lower end of the ram 62 is a nibbling tool 63 which is backed up by an axially adjustable rod 64 threaded into the body of the ram 62. The cutting tool assembly as just described snugly fits within a bushing 66 suitably fixed in the portion 25 of the upper jaw 11 of the machine, said bushing 66 being provided with an internal cylindrical bore 67 in which the cutting tool assembly reciprocates during operation of the machine. It will be noted that the cylindrical bore of the bushing 67 is in axial alinement with the bore 27 of the top bearing member 26, in consequence of which the cross-head 16 and the cutting tool assembly associated therewith, considered as a unit, are respectively provided with upper and lower bearings which serve to guide said unit along a vertically fixed rectilinear line during reciprocation thereof.

In operation of the machine of the present invention, the handle 45 is adjusted into its position shown in Figure 2 when it is desired that the cutting tool 63 be operative to cut the sheet material which is fed to and through the machine. In such normal operative position of the handle 45, the cross-head 16 is bodily lowered into such position that upon each down stroke of the cutting tool it will pierce the sheet material fed into the machine. Vertical reciprocation of the cutting tool is effected, of course, by rotary motion of the operating shaft 21 converted into reciprocable motion through the intervention of the eccentric strap or link 55 interconnecting the eccentrics 15 and 41.

In such normal operation, the upper eccentric 41 remains fixed in relation to its cross-head shaft 36, while the lower eccentric 15 of the operating shaft 21 orbitally revolves about the axis of said shaft. Such orbital movement of the eccentric 15 necessarily effects vertical displacement of the eccentric strap 55 and such strap acting on the eccentric 41, which latter acts as a pivot for the upper end of the eccentric strap 55, effects vertical reciprocation of the shaft 36 and the cross-head operatively associated therewith. The vertical reciprocation of the cross-head is in turn transmitted to the cutting tool assembly, with the result that the cutting tool 63 thereof is vertically reciprocated within the limits operative to cut the sheet material fed into the nibbling machine.

Should it be desired to adjust the cross-head upwardly so that the operating stroke of the cutting tool reciprocates within limits located above the plane of the sheet material fed into the machine, in consequence of which the tool would be ineffective to cut the sheet material, it is merely necessary to rotate the handle 44 from its position shown in Figure 2 into that shown in Figure 3. This rotation of the handle is effected by the means and in the manner hereinbefore described, the anchoring pin 48 being then engageable in the lower socket 51 of the bearing 33 for the shaft 36. In such adjusted position of the shaft 36, its eccentric 41 is dropped below the longitudinal axis of the shaft 36, in which adjusted position said eccentric again serves as the upper pivot for the eccentric strap or link 55, while the latter is being acted upon by the eccentric 15 of the operating shaft 21.

Inasmuch as in this adjusted position of the shaft 36, as shown in Figure 3, the cross-head 16 is bodily raised relatively to the axis of the operating shaft 21, reciprocation of said cross-head and the cutting tool assembly operatively associated therewith is performed in a zone in which the cutting tool 63 is ineffective to cut the work fed into the machine. Thus, without interrupting the operation of the machine, and while the cutting tool is reciprocating, the cross-head and the cutting tool assembly associated therewith may be lifted above the plane of the work to permit removal or shifting of the work or such other operations thereon as may be necessary.

The permissible stroke of the cross-head and, consequently, of the cutting tool assembly may be varied as desired by the simple expedient of changing one operating shaft 21 and its eccentric 15 for another shaft having a different eccentric throw. This replacement of one operating eccentric shaft for another may be readily effected by shifting the operating shaft 21 rearwardly of its bearing 23 to clear the eccentric 15 from the lower end of the eccentric strap or link 55. The link 55 may then be swung about the upper eccentric 41 as a pivot to one side of the shaft 21, whereupon the latter may then be axially withdrawn from its support 23 forwardly through the opening 68 formed in the slotted part 32 of the cross-head 16.

In order to provide adequate clearance for lateral movement of the lower end of the eccentric link 55 when freed from the eccentric of the operating shaft 21, the enclosure 24 for the cross-head may be provided with an opening 69 in the side wall thereof which is large enough to permit the lower boss 57 of the eccentric strap 55 to partially project therethrough. Any suitable means (not shown) may be provided in the forward end of the eccentric 15 of the operating shaft 21 to facilitate its axial withdrawal from the support 23 forwardly by way of the opening 68 formed in the lower part 32 of the cross-head.

It will be understood, of course, that the present invention is susceptible of various other changes and modifications which may be made from time to time without departing from the real spirit or general principles of the invention, and it is, accordingly, intended to claim the same broadly as well as specifically as indicated in the appended claims.

What is claimed as new and useful is:

1. In a machine of the type having a reciprocating member, a rotatably journalled operating shaft having an eccentric at one end thereof, a vertically reciprocable cross-head for operatively supporting said member, a shaft rotatably journalled in said cross-head with its axis disposed in vertically spaced parallel relation to the axis of said operating shaft, said cross-head shaft having an end eccentric disposed in the vertical plane of orbital movement of said operating shaft eccentric, an eccentric strap having its opposite ends respectively pivotally connected to the eccentrics of said operating shaft and of said cross-head shaft, and means for rotating said cross-head shaft into a selected position to vary the effective distance between the axes of said operating and cross-head shafts and so shift the cross-head into a vertically adjusted position relatively to the axis of said operating shaft.

2. In a machine of the type having a reciprocating member, a rotatably journalled operating shaft, a vertically reciprocable cross-head for operatively supporting said member, a shaft rotatably journalled in said cross-head with its axis disposed in vertically spaced parallel relation to the axis of said operating shaft, a pair of eccentrics respectively projecting from proximate ends of said operating shaft and said cross-head shaft and commonly disposed in the vertical plane of orbital movement of the operating shaft eccentric, and an eccentric strap interconnecting said eccentrics for effecting reciprocation of said cross-head upon rotation of said operating shaft.

3. In a machine of the character defined in claim 2 wherein is included means for locking said cross-head shaft against rotation in said cross-head whereby to render the eccentric of said cross-head shaft a relatively fixed part of said cross-head.

4. In a machine of the character defined in claim 2 wherein is included means for locking said cross-head shaft in any one of several angularly related positions whereby to vary the effective distance between the axes of said operating and cross-head shafts.

5. In a machine of the type having a reciprocating member, a rotatably journalled operating shaft, a vertically reciprocable cross-head for operatively supporting said member, means interconnecting said operating shaft and said cross-head for effecting reciprocation of the latter upon rotation of the former, and means for changing the effective point of connection of said interconnecting means with said cross-head to vary the reciprocating zone of the latter without affecting its length of stroke, said last-mentioned means including a shaft journalled in said cross-head and having an eccentric projecting from one end thereof for pivotal engagement with said interconnecting means.

6. In a machine of the character defined in claim 5 wherein is included means for locking said cross-head shaft in any one of several angularly adjusted positions, said cross-head shaft thereby serving as a vertically adjustable support for the cross-head.

7. In a machine of the character described, a rotatably journalled operating shaft having an eccentric at one end thereof, a vertically reciprocable cross-head, an eccentric strap journalled on said eccentric and pivotally connected to said cross-head for effecting reciprocation of the latter upon rotation of said shaft, means for shifting said cross-head into an adjusted position relatively to its pivotal connection to said eccentric strap whereby to change the zone of reciprocation of the cross-head without varying the length of stroke thereof, said cross-head being provided with an opening extending therethrough in registry with the operating shaft, said opening being of sufficient area to permit axial shifting therethrough of the operating shaft upon disconnection of said eccentric strap from the operating shaft eccentric.

CHARLES B. GRAY.

REFERENCES CITED

The following references are of record in the file of this patent:

UNITED STATES PATENTS

| Number | Name | Date |
| --- | --- | --- |
| 730,752 | Laubion | June 9, 1903 |
| 745,086 | Walker | Nov. 24, 1903 |
| 1,349,094 | Omen | Aug. 10, 1920 |
| 1,795,303 | Gray | Mar. 10, 1931 |
| 2,211,044 | Ashton | Aug. 13, 1940 |
| 2,242,782 | Gray | May 20, 1941 |
| 2,284,932 | Thieman | June 2, 1942 |